United States Patent
Tohme et al.

(10) Patent No.: US 12,518,356 B2
(45) Date of Patent: Jan. 6, 2026

(54) SYSTEM AND METHOD FOR EMPLOYING RESIDUAL NOISE IN DEEP LEARNING DENOISING FOR X-RAY IMAGING

(71) Applicant: GE Precision Healthcare LLC, Wauwatosa, WI (US)

(72) Inventors: Michel Souheil Tohme, Wauwatosa, WI (US); German Guillermo Vera Gonzalez, Menomonee Falls, WI (US); Ludovic Boilevin Kayl, Versailles (FR); Vincent Bismuth, Paris (FR); Tao Tan, Nuenen (NL)

(73) Assignee: GE Precision Healthcare, LLC, Wauwatosa, WI (US)

( * ) Notice: Subject to any disclaimer, the term of this patent is extended or adjusted under 35 U.S.C. 154(b) by 509 days.

(21) Appl. No.: 17/975,899

(22) Filed: Oct. 28, 2022

(65) Prior Publication Data
US 2024/0144441 A1    May 2, 2024

(51) Int. Cl.
*G06T 5/70* (2024.01)
*A61B 6/00* (2024.01)
(Continued)

(52) U.S. Cl.
CPC ............... *G06T 5/70* (2024.01); *G06T 5/20* (2013.01); *G06T 7/0014* (2013.01);
(Continued)

(58) Field of Classification Search
None
See application file for complete search history.

(56) References Cited

U.S. PATENT DOCUMENTS

| 10,043,243 B2 | 8/2018 | Matviychuk et al. |
| 10,284,968 B2 * | 5/2019 | Van Dijk ............. H04R 25/305 |

(Continued)

FOREIGN PATENT DOCUMENTS

| CN | 109978778 B | 11/2020 |
| CN | 112419169 A | 2/2021 |

(Continued)

OTHER PUBLICATIONS

S M A Sharif et al., Learning Medical Image Denoising with Deep Dynamic Residual Attention Network, Dec. 9, 2020, Mathematics 8, No. 12: 2192. https://doi.org/10.3390/math8122192.
(Continued)

*Primary Examiner* — Randolph I Chu
(74) *Attorney, Agent, or Firm* — Boyle Fredrickson S.C.

(57) ABSTRACT

Various methods and systems are provided for training a denoising system for a digital imaging system. The denoising system can be a deep learning denoising system formed as a blind or non-blind denoising system in which the training dataset provided to the denoising system includes a noisy image formed with simulated noise added to a clean digital image, and a reference image formed of the clean image having residual noise added thereto, where the residual noise is a fraction of the simulated noise used to form the noisy image. The use of the residual noise within the reference image of the training dataset teaches the DL network in the training process to remove less than all the noise during subsequent inferencing of digital images from the digital imaging system. By leaving selected amounts of noise in the digital images, the denoiser can be tuned to improve image attributes and texture.

20 Claims, 9 Drawing Sheets

(51) Int. Cl.
*G06T 5/20* (2006.01)
*G06T 7/00* (2017.01)

(52) U.S. Cl.
CPC ......... *A61B 6/5258* (2013.01); *G06T 2200/24* (2013.01); *G06T 2207/10116* (2013.01); *G06T 2207/20081* (2013.01); *G06T 2207/30061* (2013.01)

(56) References Cited

U.S. PATENT DOCUMENTS

| | | | |
|---|---|---|---|
| 2018/0293713 A1* | 10/2018 | Vogels | G06V 10/82 |
| 2021/0272240 A1* | 9/2021 | Litwiller | A61B 6/5258 |
| 2021/0295474 A1 | 9/2021 | Wang et al. | |
| 2022/0107378 A1* | 4/2022 | Dey | G01R 33/56 |
| 2022/0277424 A1* | 9/2022 | Kaethner | G06T 5/70 |
| 2022/0398695 A1* | 12/2022 | Choi | G06T 5/60 |
| 2023/0095222 A1* | 3/2023 | Mostapha | G06N 3/094 |
| | | | 382/128 |
| 2023/0206401 A1* | 6/2023 | Liu | G06N 3/045 |
| | | | 382/157 |

FOREIGN PATENT DOCUMENTS

| | | | | |
|---|---|---|---|---|
| CN | 106204467 B | 7/2021 | | |
| CN | 113554089 A | * 10/2021 | ........... | G06F 18/213 |

OTHER PUBLICATIONS

Jaakko Lehtinen et al., Noise2Noise: Learning Image Restoration without Clean Data, Oct. 29, 2018.

\* cited by examiner

Noisy

Denoised with 25% residual noise during training

SYSTEM AND METHOD FOR EMPLOYING RESIDUAL NOISE IN DEEP LEARNING DENOISING FOR X-RAY IMAGING

FIELD OF THE DISCLOSURE

The present disclosure is related to the field of digital imaging correction and more specifically to medical diagnostic imaging.

BACKGROUND OF THE DISCLOSURE

Digital imaging technologies including medical imaging technologies such as x-ray imaging allow for non-invasive acquisition of images of internal structures or features of a subject, such as a patient. Digital imaging systems produce digital data which can be reconstructed into radiographic images. In digital x-ray imaging systems, radiation from a source is directed toward the subject. A portion of the radiation passes through the subject and impacts a detector. The detector includes an array of discrete picture elements or detector pixels and generates output signals based upon the quantity or intensity of the radiation impacting each pixel region. The output signals are subsequently processed to generate an image that may be displayed for review. These images are used to identify and/or examine the internal structures and organs within a patient's body.

Noise in x-ray and other digital images leads to random variations in pixel brightness that gives a mottled, grainy, textured, or snowy appearance to an image. Although noise gives an image a generally undesirable appearance, the most significant effect is that noise may cover or reduce the visibility of certain features within the image. For x-ray images, the main contributor of noise is quantum, which occurs when an insufficient x-ray dose is administered to the subject, leading to poor counts statistics at the detector level.

In order to reduce the amount of noise in digital images, e.g., a x-ray images resulting from an imaging procedure, one option is to increase the x-ray dose to the patient when obtaining the x-ray image. However, as the focus of current x-ray imaging systems and techniques is the reduction of the x-ray dose to the patient, this solution in not often utilized.

As an alternative, x-ray and other digital imaging systems and associated image processing techniques utilize machine learning and in particular deep learning (DL) networks utilized with and/or incorporated within the digital imaging system. These machine learning/deep learning networks are trained to detect and reduce noise present within digital images in order to provide a cleaner digital image that enables clear viewing of the structures and features displayed within the digital image, such as to improve the diagnostic properties of an x-ray image.

The prior art methods utilized to train DL networks for digital image denoising purposes employ the process of generating a dataset of clean and noisy digital image pairs, in which the clean image contains no or little or low noise, i.e., representing the desired amount of noise for a clean image, while the noisy image is the corresponding clean image with a varying amount of added noise. During training, the DL network performs operations on the noisy image based on its architecture to denoise the noisy image and then compares it against the clean image as the reference to determine the error or differences between the denoised image and the clean, reference image. The corresponding error determined between the denoised image output by the DL network being trained and the clean reference image is then utilized to update the denoising parameters employed by the DL network in order to enable the DL network to reduce the amount of error in a subsequent denoising of a noisy image. This updating of the DL network parameters occurs many times during the training process for the DL network in an iterative manner, where the DL network denoises the images in the training dataset multiple times until convergence of the updated parameters for the operation of the DL network that achieves denoised images closely similar to the clean, reference image. As a result of the optimized parameters determined during the training process, the DL network can be employed to denoise digital images generated by an imaging system to achieve images with a quality or noise level similar to or the same as that for the clean, reference image.

However, as a result of the features of the clean, reference image utilized in the training dataset, in many situations the optimized parameters for the operation of the DL network can reduce the image quality of the denoised image produced by the DL network. This image quality reduction can be introduced into the denoised image through the operation of the DL network by eliminating all noise at certain frequencies within the image, which can also remove and/or degrade certain details within the image at or near the same frequencies, such as the sharpness of various details and/or the noise texture in the denoised image. Further, the parameters learned with regard to denoising to achieve a clean, reference image obtained via one imaging modality may not be optimal with regard to obtaining a denoised image obtained via another imaging modality.

As a result, it is desirable to develop a training method for a denoising DL network that enables the DL network to learn to remove less than all of the noise present within a digital image in order to preserve the sharpness of details within the digital image. The trained DL network can be employed within a suitable imaging system, such as medical imaging system including, but not limited to an x-ray imaging system, for denoising a digital medical diagnostic image through the DL network to preserve sharpness of the details within the images and improve the diagnostic properties of the images. Further, it is desirable to develop a denoising DL network that has improved tunability of the denoising strength.

SUMMARY OF THE DISCLOSURE

According to one aspect of an exemplary embodiment of the disclosure, a DL network employed for denoising a digital image, such as a digital diagnostic medical image produced by a medical imaging system. The DL network is trained by using a dataset of digital images including noisy images formed of clean x-ray or digital images having an amount of noise added thereto. In addition, the clean, reference x-ray or digital image utilized by the DL network also has an amount of noise added thereto. The noise added to the clean, reference x-ray or digital image, i.e., the residual noise, is a fraction of the noise that is added to the image to form the noisy image, such that the clean, reference image against which the denoised image is to be compared also contains a small portion of noise. This residual noise in the clean, reference x-ray or digital image teaches the DL network in the training process not to remove all the noise. By leaving selected amounts of noise in the noisy images, the DL network can be tuned to remove more or less noise from a noisy image in order to adjust the strength of the denoising provided by the DL network.

According to another exemplary embodiment of the disclosure, a method for training a denoiser for an x-ray system includes the steps of providing an x-ray system having an x-ray source, an x-ray detector alignable with the x-ray source, an image processing system operably connected to the x-ray source and x-ray detector to generate x-ray image data, the image processing system including a processing unit for processing the x-ray image data from the detector, non-transitory memory operably connected to the processing unit and storing instructions for operation of a denoiser and a denoiser training system, a display operably connected to the image processing system for presenting information to a user, and a user interface operably connected to the image processing system to enable user input to the image processing system, generating simulated noise, adding the simulated noise to a clean x-ray or digital image to form a noisy image, multiplying the simulated noise by a fraction to create a residual noise, adding the residual noise to the clean x-ray or digital image to form a reference image, and providing the noisy image and the reference image to the denoiser as a training dataset.

According to still another aspect of an exemplary embodiment of the present disclosure, an x-ray system includes an x-ray source, an x-ray detector alignable with the x-ray source, an image processing system operably connected to the x-ray source and x-ray detector to generate x-ray image data, the image processing system including a processing unit for processing the x-ray image data from the detector, non-transitory memory operably connected to the processing unit and storing instructions for operation of a denoiser and a denoiser training system, a display operably connected to the image processing system for presenting information to a user, and a user interface operably connected to the image processing system to enable user input to the image processing system, wherein the processing unit and non-transitory memory for the denoiser and denoiser training system is configured to generate simulated noise, to add the simulated noise to a clean x-ray or digital image to form a noisy image, to multiply the simulated noise by a fraction to create a residual noise, to add the residual noise to the clean x-ray or digital image to form a reference image, and to provide the noisy image and the reference image to the denoiser as a training dataset.

According to still another aspect of an exemplary embodiment of the present disclosure, an x-ray system includes an x-ray source, an x-ray detector alignable with the x-ray source, an image processing system operably connected to the x-ray source and x-ray detector to generate x-ray image data, the image processing system including a processing unit for processing the x-ray image data from the detector, non-transitory memory operably connected to the processing unit and storing instructions for operation of a denoiser and a denoiser training system, a display operably connected to the image processing system for presenting information to a user, and a user interface operably connected to the image processing system to enable user input to the image processing system, wherein the processing unit and non-transitory memory for the denoiser and denoiser training system is configured to generate simulated noise, to add the simulated noise to a clean x-ray or digital image to form a noisy image, to multiply the simulated noise by a fraction to create a residual noise, to add the residual noise to the clean x-ray or digital image to form a reference image, to generate a noise map, and to provide the noise map, the noisy image and the reference image to the denoiser as a training dataset.

These and other exemplary aspects, features and advantages of the disclosure will be made apparent from the following detailed description taken together with the drawing figures.

BRIEF DESCRIPTION OF THE DRAWINGS

The drawings illustrate the best mode currently contemplated of practicing the present disclosure.

In the drawings.

DETAILED DESCRIPTION OF THE DRAWINGS

Figure 1:
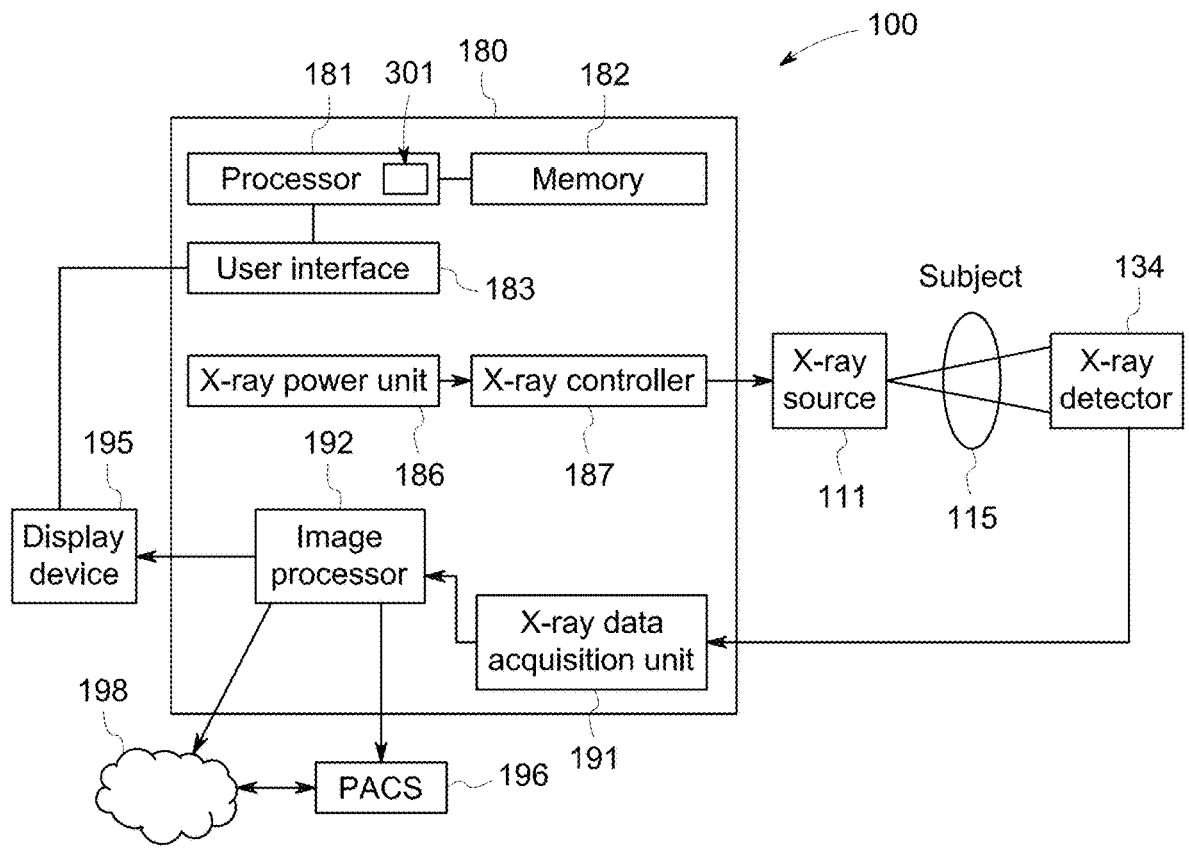
FIG. 1 shows a block schematic diagram of an x-ray imaging system, according to an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The following description relates to various embodiments of digital imaging and denoising of digital images. In particular, systems and methods are provided for parametric noise reduction in various types of digital images, such as digital diagnostic medical images obtained via various medical imaging systems, including but not limited to digital x-ray images obtained from an x-ray imaging system. An exemplary medical imaging system includes the medical digital imaging system or the x-ray imaging system depicted in FIGS. 1 and 2, and disclosed in US Patent Application Publication No. US2021/0183055, entitled Methods And Systems For Analyzing Diagnostic Images, and U.S. Pat. No. 11,288,775, entitled Methods And Systems For Parametric Noise Modulation In X-Ray Imaging (the '775 Patent), the entirety of which are each hereby expressly incorporated herein by reference for all purposes, may use an x-ray source and an x-ray detector to acquire radiographic images of a subject, such as a patient. Such radiographic images typically exhibit noise arising from quantum and electronic sources, which result in random variations in image brightness that give a mottled, grainy, textured, or snowy appearance to the images. Although noise gives an image a generally undesirable appearance, the most significant effect is that the noise may cover or reduce the visibility of certain features within the image. Besides increasing the dose to the patient to improve the image quality, the noise can be reduced via image processing techniques. The resulting perceived noise is not equal across the entire image. For example, in a typical x-ray chest exam, low-photon count areas such as the abdomen may exhibit more noise than lower-attenuation regions such as the lungs where higher photon counts are registered in the raw acquired image. Moreover, the displayed pixel size on a viewing screen also impacts the appearance of noise.

A system and method for training an artificial intelligence (AI), such as a deep learning (DL) network to be employed for noise suppression in digital images, such as the x-ray image generated by the x-ray imaging system, such as the system and method depicted in FIGS. 3-5C, utilizes a training dataset formed by injecting an amount of noise into a clean image to create a noisy image and injecting a fraction of that noise, i.e., residual noise, into the clean image to generate the reference image for comparison with the outputs of the DL network during the training of the DL network. The residual noise used to form the reference image enables the DL network to be trained to remove more or less noise from the digital images supplied to and analyzed by the DL network, to tune the DL network to remove only the desired amount of noise from the digital images. In addition to injecting the residual noise into the clean image to form the reference images can be performed in the training of blind DL network denoisers, the use of the residual noise in the reference image can also be used in the training of non-blind DL network denoisers, where the residual noise is accounted for in the noise maps or denoising strength maps employed by the DL network denoisers as shown in the exemplary embodiments of FIG. 6-8.

While the systems and methods provided herein are described with regard to x-ray imaging techniques, it should be appreciated that the techniques provided herein may also be applied to various other digital imaging modalities for medical and non-medical imaging purposes, including various medical imaging modalities including but not limited to x-ray imaging (e.g., single energy, dual energy, tomography, image pasting, fluoroscopy, mammography, and so on), computed tomography (CT), positron emission tomography, ultrasound, and magnetic resonance imaging, among others.

FIG. 1, a block diagram of an x-ray imaging system 100 in accordance with an embodiment is shown. The x-ray imaging system 100 includes an x-ray source 111 which radiates x-rays toward a subject 115, and an x-ray detector 134 disposed opposite the subject 115 from the source 111 for detecting x-rays radiated by the x-ray source 111 and attenuated by the subject 115.

The operation console 180 comprises a processor 181, a memory 182, a user interface 183, an x-ray power unit 186, an x-ray controller 187, an x-ray data acquisition unit 191, and an image processor 192. X-ray image data transmitted from the x-ray detector 134 is received by the x-ray data acquisition unit 191. The collected x-ray image data from detector 134 are image-processed by the image processor 192. A display device 195 communicatively coupled to the operating console 180 displays an image-processed x-ray image thereon.

The x-ray power unit 184 and the x-ray controller 182 supply power of a suitable voltage current to the x-ray source 111. A collimator (not shown) may be fixed to the x-ray source 111 for designating an irradiated field-of-view of an x-ray beam. The x-ray beam radiated from the x-ray source 111 is applied onto the subject via the collimator.

In the depicted example, the image processor 192 is also in communication with a picture archiving and communications system (PACS) 196, which may in turn be in communication with one or more image processing systems 198. Image processing system 198 may be an edge device, such as an edge processing device, a cloud processing device, or another device. In some embodiments, image processing system 198 may communicate directly with one or more medical imaging systems, such as directly communicating with the operation console 180/image processor 192, or may communicate with the medical imaging systems through an intermediate network, for example through another medical device data system or network. Image processing system 198 may be communicatively coupled to multiple x-ray imaging machines in addition to the operation console 180 of FIG. 1. For example, image processing system 198 may be located at a medical facility in which the x-ray imaging system 100 is located, and image processing system 198 may be connected (e.g., via a wireless connection) to one or more additional x-ray machines at the medical facility, where each additional x-ray machine includes an operation console storing an image processor configured to generate x-ray images based on x-ray data acquired from an x-ray detector in response to x-rays emitted from an x-ray source.

In certain embodiments of the x-ray imaging system 100, the image processor unit 192 is configured to reconstruct images of a target volume of the subject 115 using an iterative or analytic image reconstruction method. For example, the image processor unit 192 may use an analytic image reconstruction approach such as filtered back projection (FBP) to reconstruct images of a target volume of the patient. As another example, the image processor unit 192 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 115. As described further herein, in some examples the image processor unit 192 may use both an analytic image reconstruction approach such as FBP in addition to an iterative image reconstruction approach.

In some x-ray and/or CT imaging system configurations, a radiation source projects a cone-shaped beam which is collimated to lie within an X-Y-Z plane of a Cartesian coordinate system and generally referred to as an "imaging plane." The radiation beam passes through an object being imaged, such as the patient or subject 115. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detector elements are acquired separately to produce a transmission profile.

In some x-ray and/or CT systems, including x-ray systems operated in tomography acquisition mode, the radiation source and the detector array are rotated with a gantry within the imaging plane and around the object to be imaged such that an angle at which the radiation beam intersects the object constantly changes. A group of radiation attenuation measurements, e.g., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present disclosure in which data representing an image is generated but a viewable image is not. Therefore, as used herein, the term "image" broadly refers to both viewable images and data representing a viewable image. However, many embodiments generate (or are configured to generate) at least one viewable image.

Figure 2:
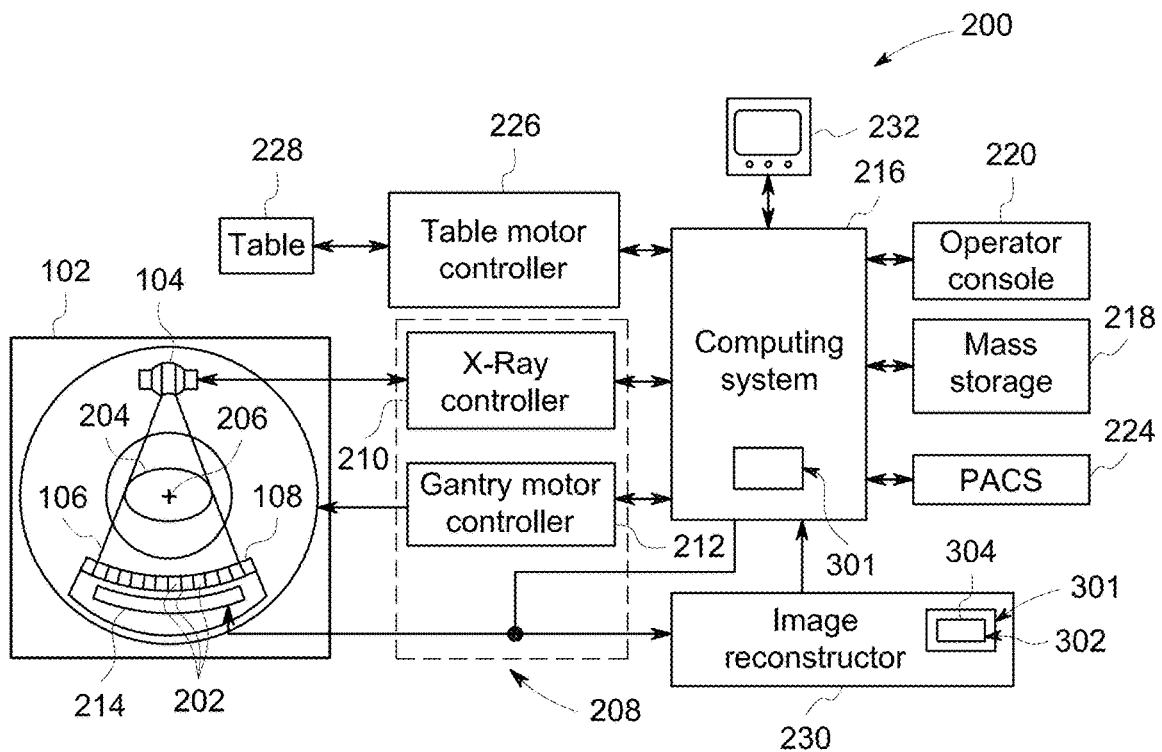
FIG. 2 shows a block schematic diagram of an exemplary imaging system, according to an embodiment.

FIG. 2 illustrates an exemplary imaging system 200 similar to the x-ray and/or CT system 100 of FIG. 1. In accordance with aspects of the present disclosure, the imaging system 200 is configured for imaging a subject 204 (e.g., the subject 115 of FIG. 1). In one embodiment, the imaging system 200 includes the detector array 108 (see FIG. 1). The detector array 108 further includes a plurality of detector elements 202 that together sense the x-ray beams 106 that pass through the subject 204 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, non-transitory memory and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 228 which may be a motorized table. Specifically, the table motor controller 226 may move the table 228 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various methods and processes (such as the method described below with reference to FIG. 3) described further herein may be stored as executable instructions in non-transitory memory on a computing device (or controller) in imaging system 100, 200. In one embodiment, image reconstructor 230 may include such executable instructions in non-transitory memory, and may apply the methods described herein to reconstruct an image from scanning data. In another embodiment, computing device 216 may include the instructions in non-transitory memory, and may apply the methods described herein, at least in part, to a reconstructed image after receiving the reconstructed image from image reconstructor 230. In yet another embodiment, the methods and processes described herein may be distributed across image reconstructor 230 and computing device 216.

In one embodiment, the display 232 allows the operator to evaluate the imaged anatomy. The display 232 may also allow the operator to select a volume of interest (VOI) and/or request patient information, for example, via a graphical user interface (GUI) for a subsequent scan or processing.

Figure 3:
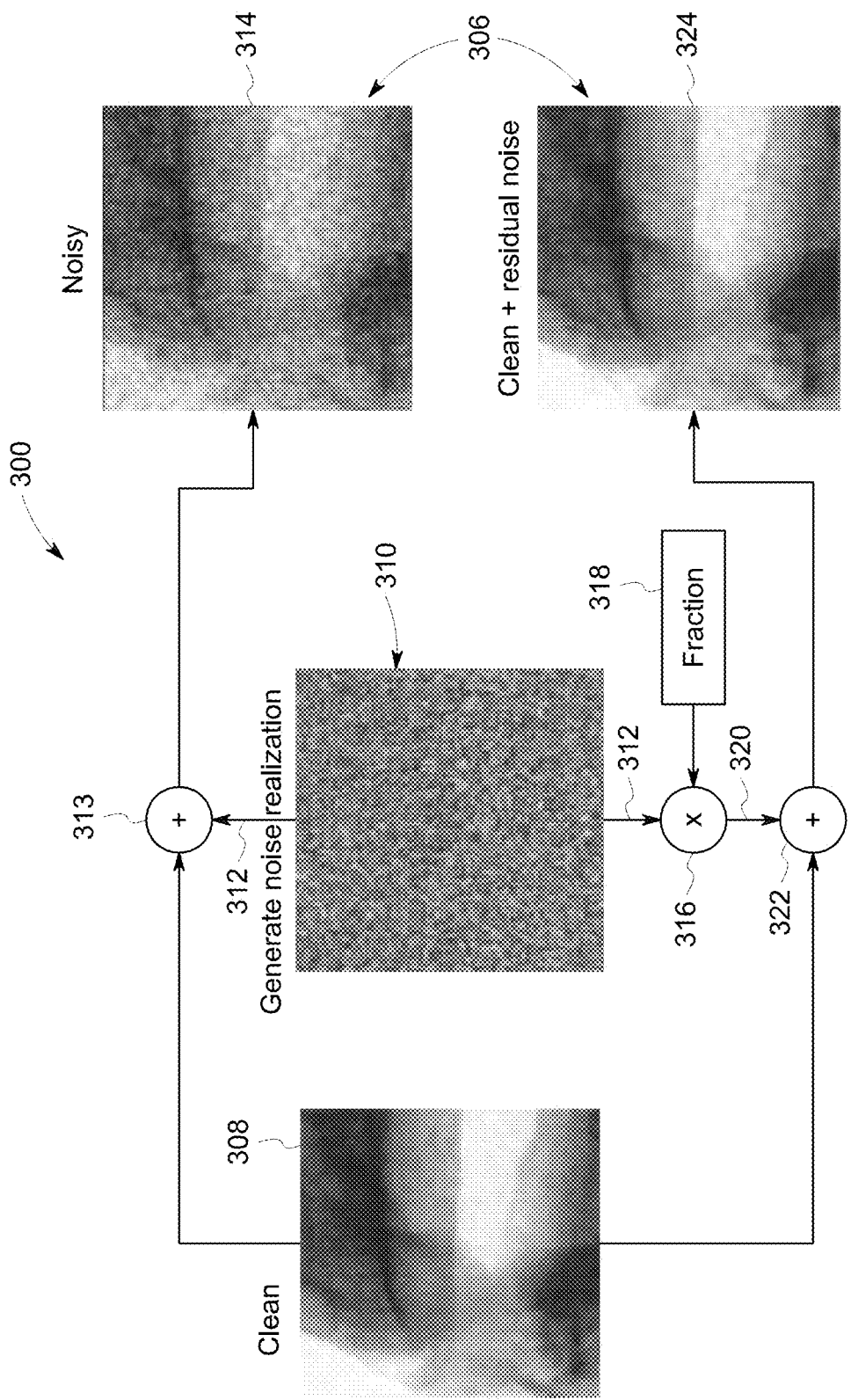
FIG. 3 is a block schematic diagram of an exemplary DL network training system and/or process including the addition of residual noise to the clean, reference image forming a part of the training dataset according to an exemplary embodiment of the disclosure.
Figure 4:
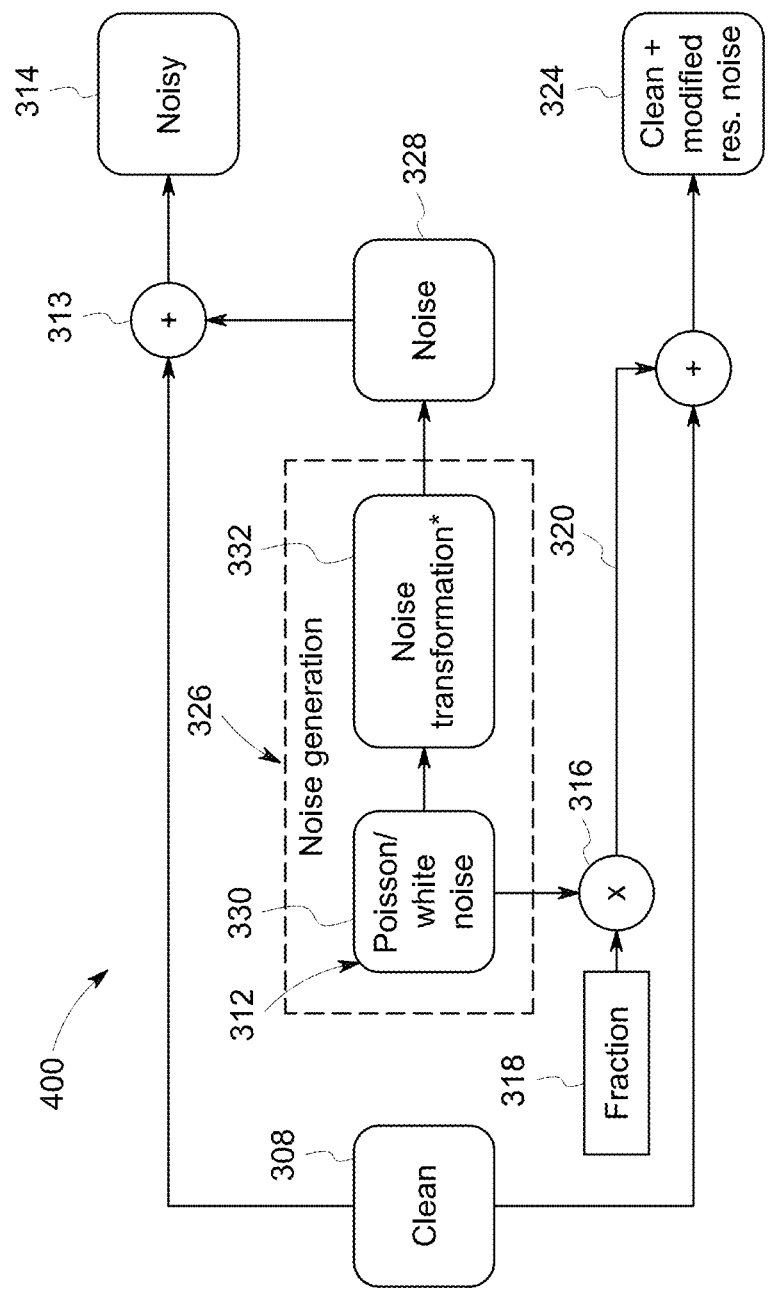
FIG. 4 is a schematic diagram of an exemplary DL network training system and/or process including the addition of modified residual noise to the clean, reference image forming a part of the training dataset to impact image texture according to an exemplary embodiment of the disclosure.

Referring to FIGS. 3 and 4, an exemplary embodiment of the system 100, 200 includes a denoising system/denoiser 301 trained according to an exemplary method 300, 400 and employed as a part of the image processor unit 181, the computing device 216 and/or the image reconstructor 230, or within a remote computing system that is operably connected to the imaging system 100, 200, where the denoiser 301 can be formed as an artificial intelligence (AI) denoiser 302 stored as executable instructions in non-transitory memory 218 on or connected to a computing device (or controller) 216 in imaging system 100, 200. The AI denoiser 302 can be formed as one or more of a trained deep learning model, a linear regression model, and a non-linear regression model, and in one embodiment is a deep learning (DL) network 304 that is supplied with the x-ray data/reconstructed x-ray data and/or images in order to provide denoising to the x-ray data/images generated by the x-ray imaging system 100, 200.

The DL network denoiser 304 utilizes a method of noise reduction that employs denoising with residual noise to suppress noise and improve noise texture in various imaging applications such as X-ray imaging (in single energy, dual energy, tomography, and image pasting modes), fluoroscopy, mammography, as well as other imaging modalities such as CT (Computed Tomography), PET (Positron Emission Tomography), ultrasound and MRI (Magnetic Resonance Imaging) among others.

In particular, as illustrated in the exemplary embodiment of the training method 300 of FIG. 3, the denoiser 304 is trained using a training dataset 306 supplied to the denoiser 304 to enable the denoiser 304 to learn the desired function for the denoising of any digital images, e.g., x-ray images, supplied to the denoiser 304. While the DL network denoiser 304 is employed with the imaging system 100, 200, the training of the denoiser 304 can be conducted directly within the system 100, 200, or on a computing device (not shown) separate from the imaging system 100, 200, where the trained denoiser 304 is then transferred to the imaging system 100, 200 for operation in conjunction with the imaging system 100, 200. To create the training dataset 306 for the DL network denoiser 304, in the exemplary embodiment for the application of the denoiser 304 to x-ray images, initially a clean, input image 308 is selected and provided to the system and method 300. In one exemplary embodiment, the clean, input image 308 is an image that is representative of an x-ray image of the type to be analyzed by the DL network denoiser 304 when in use within the x-ray imaging system 100, 200. In a first step 310, an amount of training noise 312 is generated by the system 100, 200 or separate computing device and subsequently added in step 313 to the clean, input image 308 to form a noisy x-ray image 314. The training noise 312 can be created and/or selected in a number of different manners. For example, the probability distribution of the training noise 312 could vary depending on the modality/application. The training noise 312 can be generated using either Gaussian or Poisson distributions, but other distributions could be selected based on the need. In addition, the training noise 312 can be formed with natural noise, such as noise that is naturally produced during the operation of the system 100, 200, with simulated noise generated by the system 100, 200 or computing device, or a combination thereof. Furthermore, the training noise 312 could be count-independent (which means the magnitude of the noise is independent to the signal level in the digital image), or count-dependent (in which there is a relationship between the magnitude of the noise and the signal level in the digital image.)

In step 316, the training noise 312 added to form the noisy image 314 is subjected to a reduction in accordance with a fraction 318, defined as a percentage of the entire training noise 312 that is less than one hundred percent (100%), applied to the noise 312 to provide a lessened amount of noise, or residual noise 320. Residual noise 320 is defined as a portion/fraction of the original training noise 312 that is injected to the clean image 308 during the training of the DL network 304 to improve certain image quality features and provide other benefits to the denoising functionality and training of DL network denoisers 304. This residual noise 320 is added into the clean image 308 in a third step 322 in order to form a reference image 324. The noisy image 314 and the reference image 324 including the residual noise 320 are then employed as a training dataset 306 for the DL network 304 in order to enable the DL network denoiser 304 to derive parameters for its operation that can reduce the training noise 312 from a noisy image 314 to achieve the reference image 324 as an output from the DL network denoiser 304.

DL network denoisers 304 are formed as either blind denoisers (no additional information provided to the denoiser 304 other than the input noisy image 314 and reference image 324) and non-blind denoisers (includes a noisy image 314, reference image 324 and image/noise map 350 (FIG. 6) as input to denoiser 304 that provides information regarding the training noise 312 at each pixel forming the noisy image 314). When used in forming the training dataset 306 for a blind DL network denoiser 304, a fixed fraction 318 of the actual training noise 312 is employed to form the residual noise 320 during training of blind DL network denoisers 304 to tweak the denoising strength utilized by the DL network denoiser 304 during subsequent inferencing of an x-ray image obtained by the imaging system 100, 200. In particular, the residual noise 320 that is added to the clean image 308 helps with the overall denoising strength tunability, wherein an increased ratio/fraction of residual noise 320 injected into the clean image 308 to form the reference image 324 for the training dataset 306 used with the DL network denoiser 304 will lead to a weaker denoising strength being applied by the DL network denoiser 304 during subsequent inferencing of a digital image, e.g., x-ray image, and vice versa. The use of residual noise 320 in the reference image 324 leads to improved algorithms employed by DL network denoisers 304 which allow for a more tunable denoising, while also enabling the use of the same method 300, 400 to achieve various levels of denoising strength (e.g., Low, Medium, High, etc.) by tuning the fraction 318 without resorting to injecting a portion of the noise back after denoising. The amount of residual noise used during training will determine the maximum denoising strength of the noise filter/denoiser 304. To achieve different levels of denoising strength (low, medium, high) when a blind denoiser is used it is necessary to train three models 304 with different levels of residual noise. However, if it is a non-blind denoiser 304, the denoising strength of a single model 304 can be controlled using selected noise levels, such as via the noise-map 350, up to the maximum denoising that the filter/denoiser 304 can deliver based on the amount of residual noise 312 used during training. Also, in other embodiments the denoiser 304 can be trained using both blind and non-blind methods.

Further, with reference now to the illustrated exemplary embodiment of FIGS. 4 and 5A-5C, the training noise 312 can be generated according to a training system and method 400 similar to training system and method 300 but including a step 326 where the training noise 312 is subjected to different components 332 that modify, improve and/or transform the texture of the noise 312 to form a modified training noise image 328, where the transformation can be formed to simulate the physical behavior of a system, e.g., a physiological system within the body of the subject 204. This modified training noise 328 is then added to the clean image 308 to generate the noisy image 314. In contrast, the unmodified/untransformed noise 330 is multiplied by the fraction 318 to form the residual noise 320, which is then added to the clean image 308 to form the reference image 324. As shown in FIG. 4, in step 326 the noise transformation 332 is modifying the noise 312 to form the noise 328 utilized to form the noisy image 314. However, there are other alternative embodiments of the method 400 where the transformation 332 can be applied to any element, e.g., to the residual noise 320 added to form the reference image 324, to the noise 312 to form the noise 328 and the residual noise 320, and/or with possibly different transformations 332 applied to the noise 312 used to form noise 328 for the noisy image 314 and applied to the residual noise 320. The creation of the training noise 312 according to system and method 400 enables a DL network denoiser 304 trained via the system and method 400 to visually counter the effects of the detector response function and confer desirable characteristics of the leftover noise in the output image(s) 502, 504 provided by the inferencing by the denoiser 304 to the x-ray image(s) 500 obtained by the imaging system 100, 200 and supplied to the denoiser 304. In particular, in the system and method 400 the training noise 312 and the residual noise 320 can be initially generated in step 326 to improve and/or modify the texture of the residual noise 320 and as a result train the DL network denoiser 304 to confer similar characteristics to the denoised images output from the denoiser 304. For example, the noise present in an x-ray image is formed mainly of quantum noise coupled with the detector response function. This detector response function is specific to each type of detector/detector array 108, 134 and leads to blurring of the noise present in the x-ray images obtained by the imaging system 100, 200 and input to the DL network denoiser 304. To enable the denoiser 304 to reduce and/or eliminate the effects of detector blurring, in the noise generation step 326 of FIG. 4, the image processor unit 110, the local or remote computing device 216 and/or the image reconstructor 230 implementing the method(s) of training the DL network denoiser 304 can generate modified training noise 328 formed of a Poisson or white noise component 330, or any other suitable noise component or distribution, and a noise transformation component 332, e.g., a component simulating the detector blur, that is added to the clean image 308 to form the noisy image 314. However, prior adding the noise transformation component 332 to form the modified simulated noise 328 used to form the noisy image 314, only the Poisson/white noise component 330 is subjected to the reduction by the specified fraction 318 in step 316 to form the residual noise 320 that is added to the clean image 308 to form the reference image 324. By adding a noise component representative of the detector blur for the associated detector/detector array 108 for the imaging device/system 100, 200 in the noisy image 314 but not the reference image 324, the DL network denoiser 304 can be trained to suppress the effects of the detector blur and produce/output denoised images 502, 504 with more visually pleasing higher frequency and correlation-reduced noise textures. The type and/or amount of the noise transformation component 332 employed can be varied in forming the noisy image(s) 314 for the training dataset 306 in order to provide the desired noise texture for the output images 504 provided by the denoiser 304.

Figure 5A:
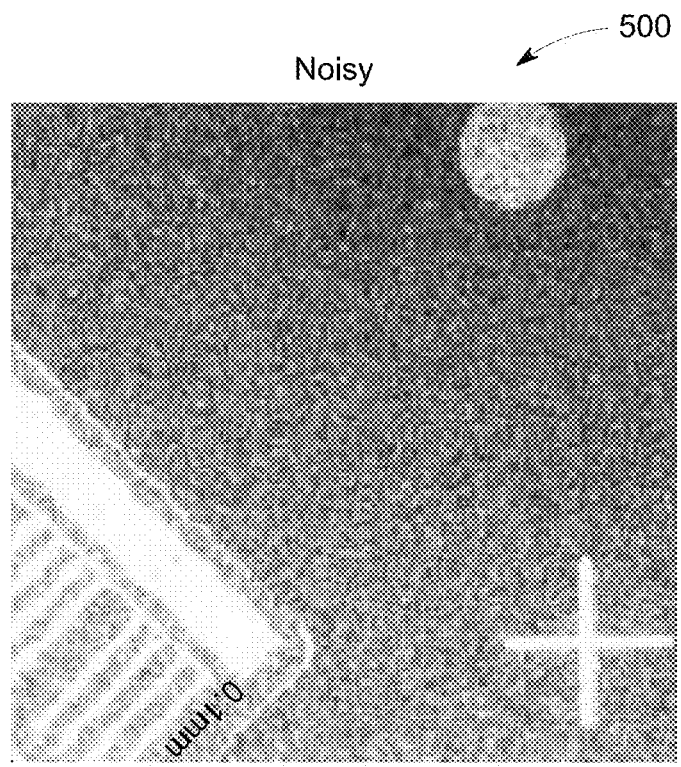
FIGS. 5A-5C are photographs of noisy and denoised x-ray images having varying image texture resulting from the system and process of FIG. 4 according to exemplary embodiments of the disclosure.
Figure 5B:
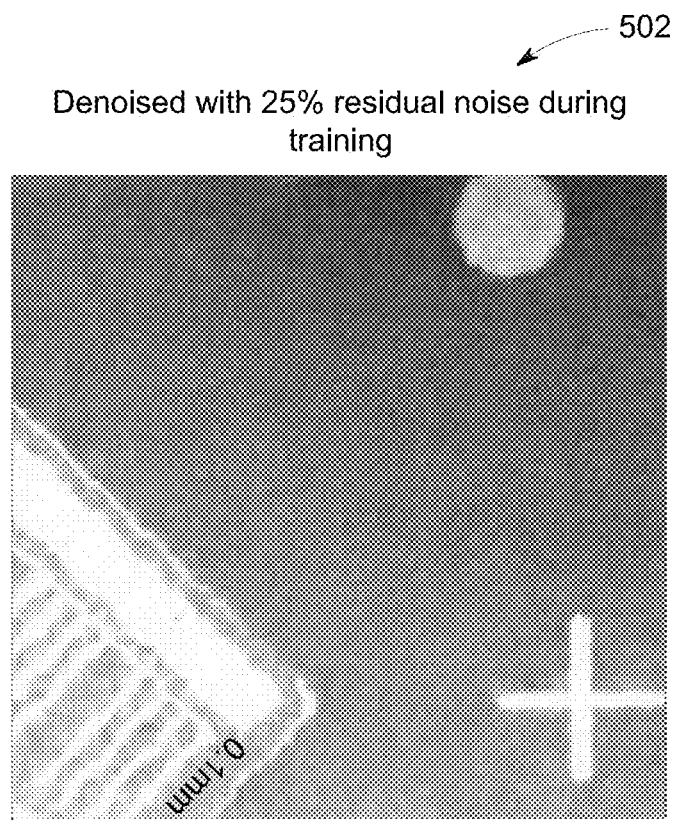
Figure 5C:
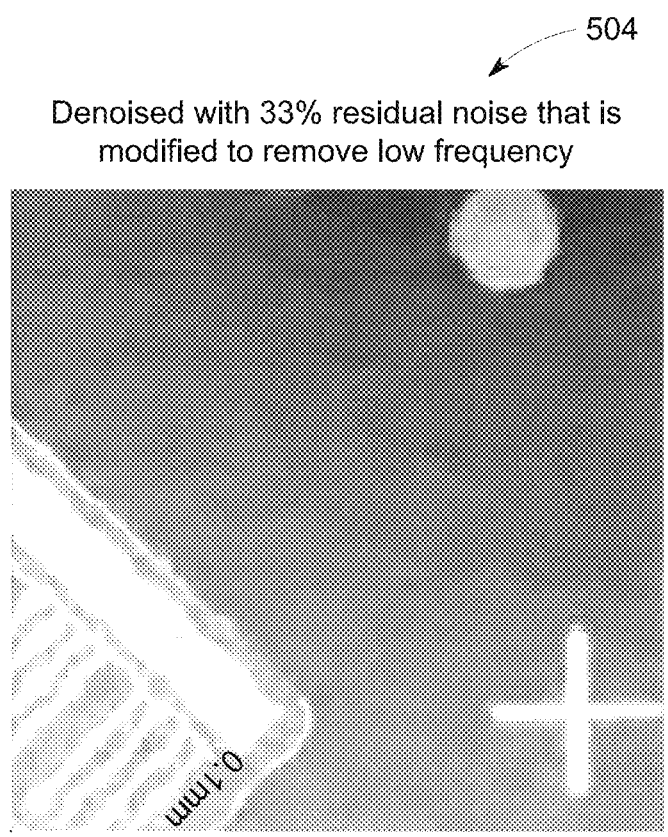

For example, with reference to FIGS. 5A-5C, FIG. 5A illustrates a noisy x-ray image 500 obtained by the x-ray imaging system 100, 200 and supplied to the trained DL network denoiser 304. FIG. 5B illustrates a denoised output image 502 from the denoiser 304 in which the denoiser 304 was trained with a reference image 324 containing residual noise 320 formed as a 25%/quarter fraction 318 of the noise 312 used to form the noisy image 314 according to the method of FIG. 3. Further, FIG. 5C illustrated a denoised output image 504 from the denoiser 304 in which the denoiser 304 was trained with a reference image 324 containing residual noise 320 formed as a 33%/one-third fraction 318 of the training noise 312 used to form the noisy image 314, and where the training noise 312 forming the noisy image 314 includes a noise transformation component 332, e.g., a low frequency noise transformation component/detector blurring component, such as a component based on the point spread function (PSF), also known as the "impulse response", where the PSF function describes the response of an imaging system to a point source, to reduce and/or eliminate detector blurring in the output image 504, according to the method of FIG. 4.

Figure 6A:
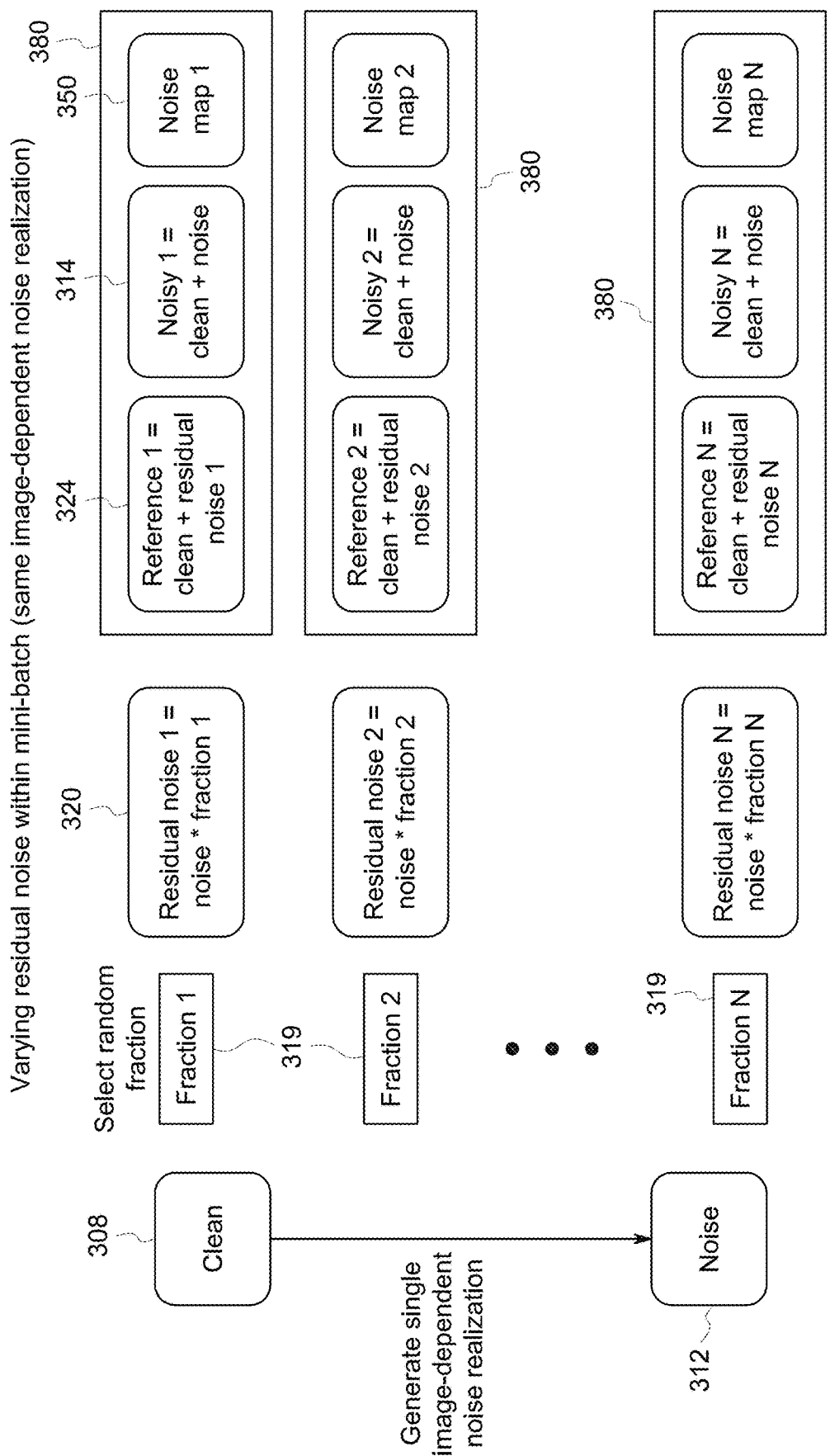
FIGS. 6A-6D are a schematic views of an exemplary DL network training system and/or process including the addition of residual noise at various fractions to generate N noisy/clean image/noise map sets forming the training dataset according to exemplary embodiments of the disclosure.
Figure 6B:
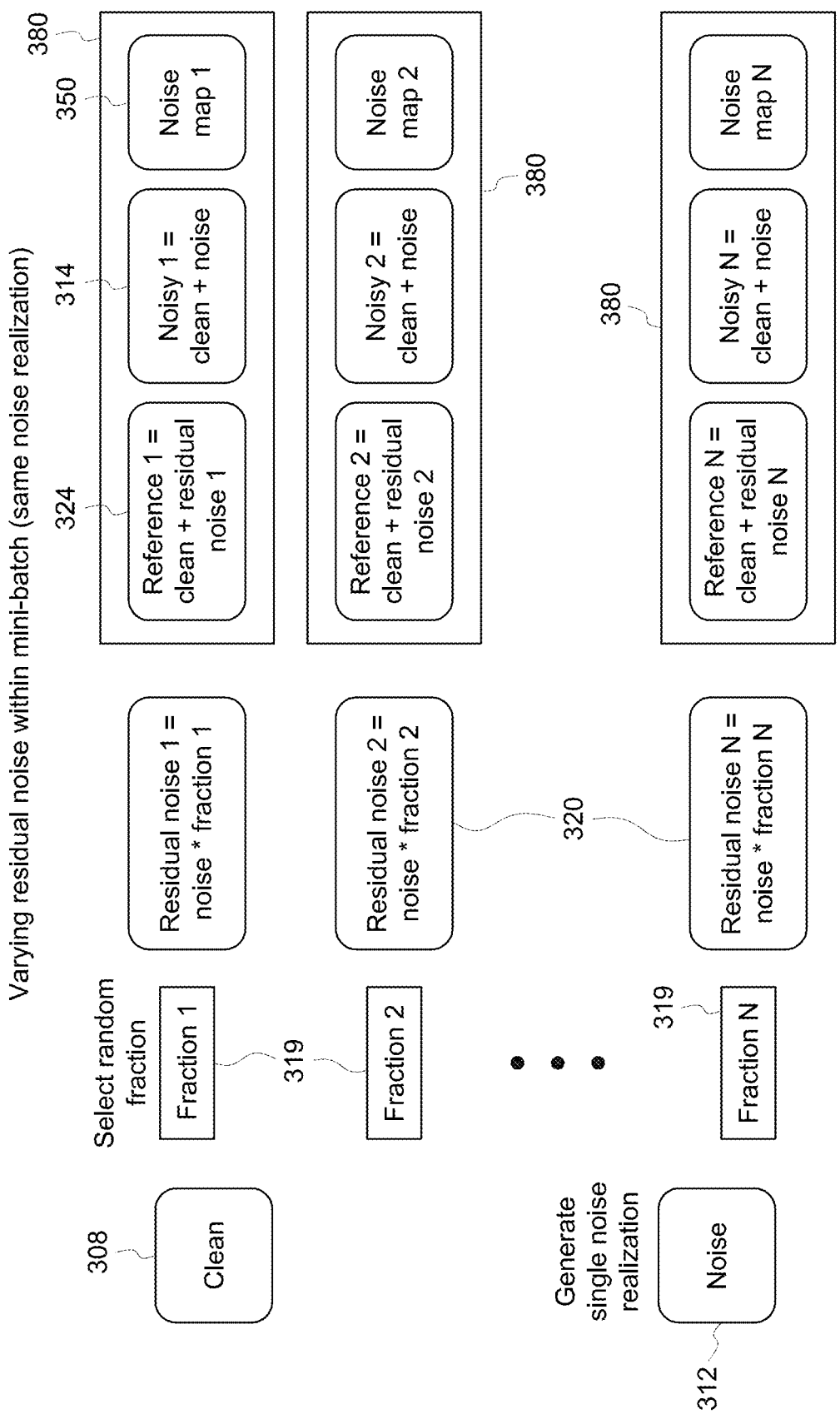
Figure 6C:
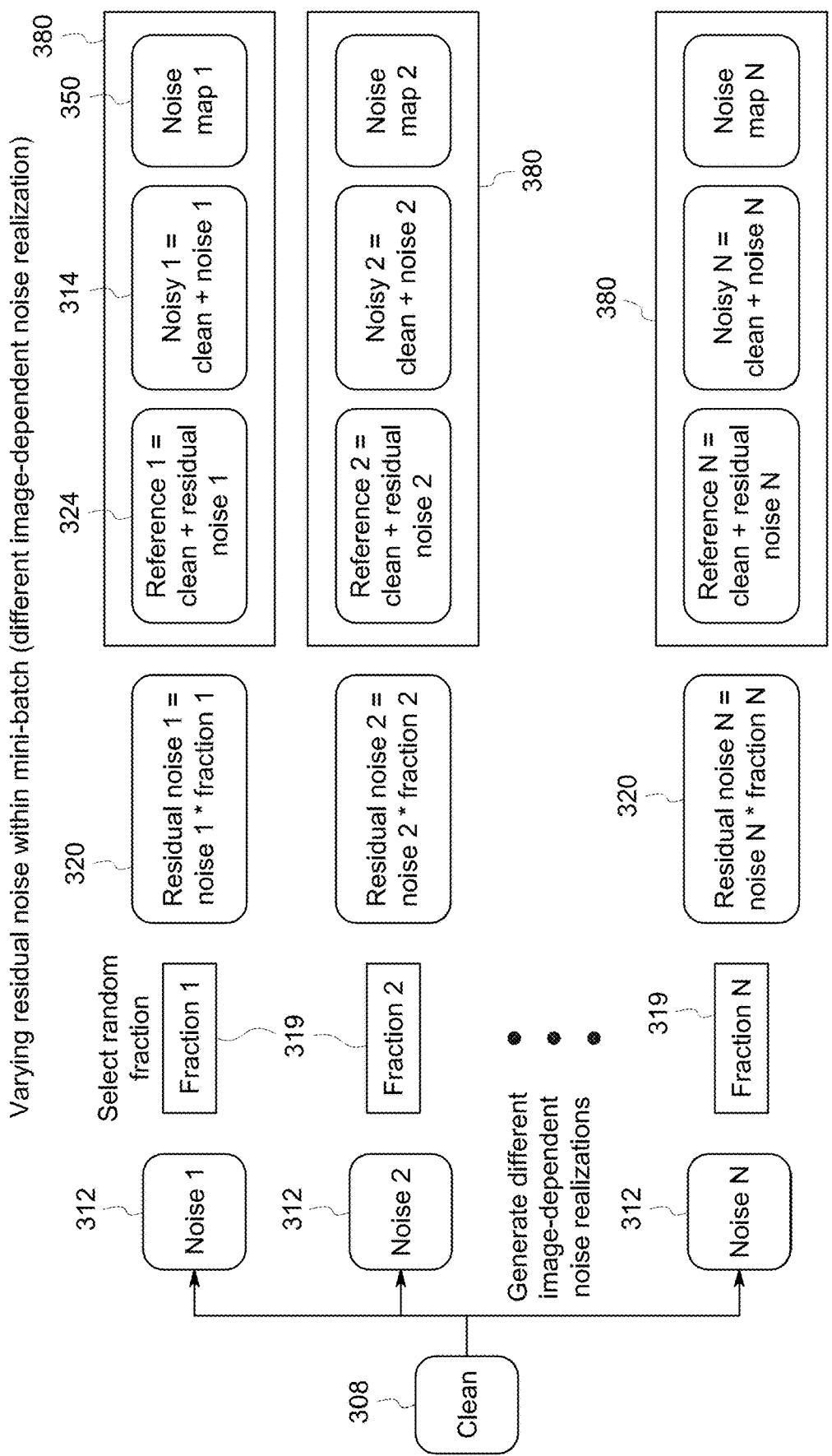
Figure 6D:
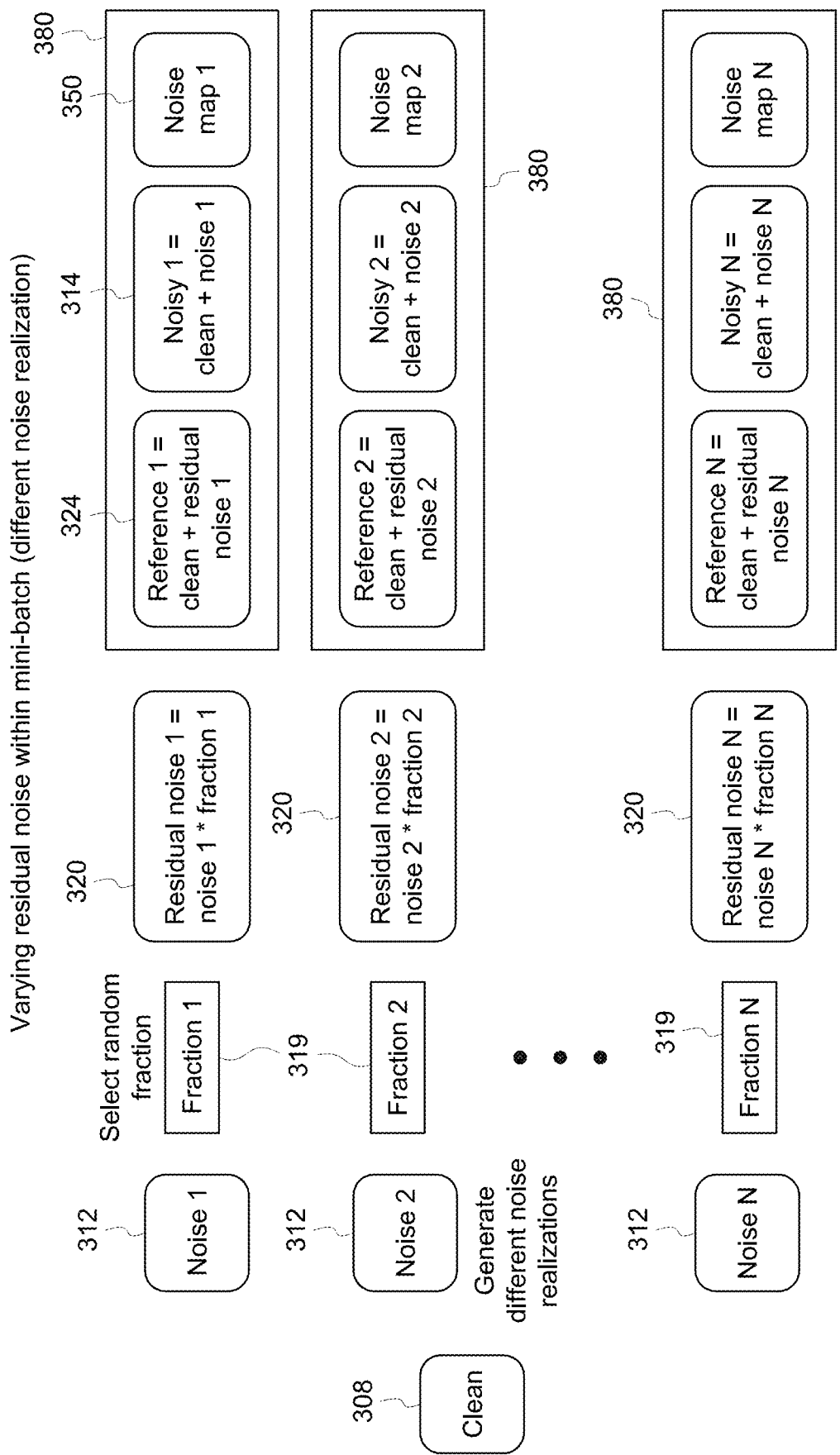

Referring now to FIGS. 6A-6D, in another exemplary embodiment of the disclosure, for the of non-blind denoisers 304, a system and method for forming the training dataset 306 to train the denoiser 304 includes an initial step 602 of applying multiple, i.e., from 1 to N, random fractions 319 to the training noise 312 in separate and independent processes. There are a number of different methods of forming the training dataset 306, some exemplary embodiments of which are illustrated in FIGS. 6A-6D. In FIG. 6A, a single training noise 312 is generated for all the images 308 within the mini-batch 380, where the training noise 312 is image-dependent, i.e., the intensity and distribution of training noise 312 depends on a noise model dictating the relationship between the pixel values in the clean image 308 and the associated noise. Alternatively, in FIG. 6B, a single training noise 312 can be generated for all the clean images 308 within the mini-batch, and where the training noise is image-independent, i.e., the training noise is not related to the clean image 308 in any predictive manner. Further, in FIG. 6C, a different training noise 312 can be generated for use in the formation of each of the noisy images 314/reference images 324 within the mini-batch 380, where the training noise 312 is image-dependent. Finally, in FIG. 6D, a different training noise 312 can be generated for use in the formation of each of the noisy images 314/reference images 324 within the mini-batch, where the training noise 312 is image-independent. Additionally, any of the exemplary embodiments of FIGS. 6A-6D can employ a transformation 332 of the random fraction training noise 312 to add to the clean image 308 to form the reference image 324, according to the discussion of the method of FIG. 4, while using the un-transformed noise 312 and clean image 308 to form the noisy image 314.

With regard to each of FIGS. 6A-6D, each random fraction 319 is selected independently of the other N random fractions 319. The training noise 312 is subsequently multiplied by each random fraction 319 to form a separate residual noise fraction 320. The training noise 312 is then added to the clean image 308 using the system and method 300 or 400 of FIG. 3 to create a noisy image 314, and a reference image 324 is created including the clean image 308 with the residual noise 320 added thereto, and a noise map 350 for the noisy image 314, as generated by a noise map generator (not shown), an example of which is disclosed in the '775 Patent previously incorporated herein by reference, for each of the N random fractions 319 applied to the training noise 312.

With regard to the generation of the noise map 350, there are many ways to generate a noise map 350, but the key is to be consistent in the manner of generation of the noise map 350. One exemplary manner in which to generate the noise map 350 for a particular combination of a noisy image 314 and corresponding reference image 324 is to compute the variance or standard deviation of the noise 312 that is added to the clean image 308 to form the noisy image 314. For example, if a count-independent Gaussian noise method is employed to generate the noise 312, Gaussian noise can be added with a variance V to the clean image 308. The noise map 350 will then be a uniform image with the value V. However, this method only works for training the network 304 where it is known exactly how much noise 312 is added to form the noisy image 314/reference image 324 combination. After training of the network 304 is completed, to subsequently denoise a noisy clinical x-ray image, it is required to estimate the amount of noise in the clinical image in order to form a noise map 350 tailored for that image. Again, there are several ways to provide the estimation, such as using a noise model to estimate the relationship between signal level and noise. The '775 patent uses such a noise model, though it is not required in all applications. For example, an alternative method can revolve around empirically finding the correct noise map value that will completely denoise a featureless noisy image at a given signal count level into a flat image at that same count level. This relationship between signal count level and noise map is characterized by several system and acquisition parameters such as the dose level, source energy, pixel size, detector type, attenuation object medium, calibration values, image display medium, among others, to form a noise map model. Furthermore, the fraction amount 319 can also have an impact on the generation of the noise map. One could account for a high fraction 319 that leads to a reference image 324 that includes high noise levels with a noise map with reduced intensity to signal the denoiser to tune down the denoising strength as to match the noise level in the reference image 324 after denoising the noisy image 314. That intensity reduction of the noise map could take the form of simple relationships such as (1—fraction) or more complex relationships. Alternative to a noise-dependent noise map, one could employ a noise-independent noise map in which the desired denoising intensity between 0 and 1 is passed along with the noisy and clean image during training. In such a case, a noise map of 0 would signify "no denoising", while 1 would signify "full denoising". Similarly to noise-dependent noise maps, the noise-independent noise map could account for different values of fraction 319 by reducing its intensity as the fraction value 319 increases during the generation of the noisy 314/reference 324/noise map 350 set.

The methods of FIGS. 6A-6D each teach the network 304 to tune the denoising strength according to the noise map 350. One way of reinforcing this training is to repeatedly show or use the same base clean image 308, but with varying amounts of noise 312 added thereto based on the random fraction(s) 319 separately applied to the noise 312 to form a number of different training noise fractions N applied to the clean image 308 to form a corresponding number of different noise maps N, e.g., a first training noise fraction and a second training noise fraction used to form a first noise map and a second noise map, respectively. The random fraction 319 is applied to the noise 312 that is added to the clean image 308 to form each reference image 324 and noisy image 314 pair and to the corresponding noise map 350. By using different fractions 319 to create the individual sets of noisy images 314, reference images 324 and noise maps 350 forming the mini-batch 380 utilized as a training dataset 306 for the network 304, during training the network 304 can be taught to fine tune its denoising strength.

The term mini-batch is used in machine learning to determine how many separate inference steps are performed before correcting the network 304 being trained. If mini-batch=1, then only a single noisy image 314/reference image 324/noise map 350 pair or set is used by the system 100, 200 or computing device as the training dataset 306 to train the network 304 before generating the error between inferred noisy image 314 and the reference image 324, and back-projecting the error to update the parameters to be employed by the network 304 in subsequent denoising processes. In many processes a mini-batch 380 of 256 means the use of a training dataset 306 including 256 noisy images 314 and their reference image 324 counterparts. The results of inferring each pair of noisy images 314 and reference images 324, i.e., the cumulative error of those 256 steps is then back-projected to update the network parameters. In this example, if a training dataset 306 consists of 300,000 image patches, 256 images are selected at a time to form the mini-batch, and batches of 256 images are continually selected until the 300,000 images in the database are employed. In this example, 242 epochs are performed in total, which means the entirety of the 300,000 images are cycled through 242 times. In this particular case, instead of picking 256 different images (if mini-batch size=256) from the training database to form one mini-batch, the same clean image 308 can be used to generate 256 different combinations of noisy/reference images by using 256 different values of the fraction 319. This effectively augments the training database and at the same time improving the denoising tuneability of the trained network 304.

In the embodiments of FIGS. 6A-6D, by using a varying fraction 318 of residual noise 320 and accounting for it in the noise map 350 during training of non-blind networks enables the DL network or other AI denoiser 304 to be formed with enhanced tuneability of denoising strength during inferencing of images 500 obtained by an x-ray imaging system 100, 200 that are supplied to the denoiser 304.

Further in addition to removing noise, the network 304 can be trained to perform other tasks as well, including but not limited to, removing anti-scatter grid line artifacts, bad pixels and/or bad lines, and EMI (electromagnetic interference), among other aspects, from the images supplied to the network 304.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. A method for training one of a blind denoiser or a non-blind denoiser for a digital imaging system, the method comprising the steps of:
   a. generating training noise;
   b. adding the training noise to a clean digital image to form a noisy image;
   c. multiplying the training noise by a fraction to create a residual noise;
   d. adding the residual noise to the clean digital image to form a reference image; and
   e. providing the noisy image and the reference image to the denoiser as a training dataset,
      wherein the training dataset including the residual noise in the reference image enables the denoiser to be tuned to remove more or less noise from a noisy image to adjust the strength of the denoising provided by the trained denoiser, and
      wherein the digital imaging system is a digital medical imaging system.

2. The method of claim 1, wherein the training noise is image independent.

3. The method of claim 1, wherein the training noise is image dependent.

4. The method of claim 1, wherein the training noise can be extracted from actual images or simulated from a desired distribution.

5. The method of claim 1, wherein the step of generating training noise includes a transformation of the noise.

6. The method of claim 5, wherein the step of generating training noise includes a transformation of the noise to simulate the physical behavior of a system.

7. The method of claim 6, wherein the step of generating training noise includes a transformation of the noise to simulate the physical behavior of a component of a system.

8. The method of claim 5, in which the noise transformation is only applied to the noise added to form the reference image.

9. The method of claim 5, in which the noise transformation is only applied to the noise added to form the noisy image.

10. The method of claim 5, in which the noise transformation applied to form the noisy image is different than the noise transformation applied to form the reference image.

11. The method of claim 1, further comprising the step of forming a noise map as a part of the training dataset to achieve a non-blind denoiser.

12. The method of claim 11, wherein the training dataset includes a training mini batch created for a given input image, and wherein the mini batch set is formed in a method comprising the steps of:
 a. generating N training noises;
 b. generating N random fractions;
 c. creating N residual noises by multiplying each training noise by a corresponding random fraction;
 d. creating N reference images by adding each of the N residual noises to the input image;
 e. creating N noisy images by adding the N training noise to the input image;
 f. creating N noise maps;
 g. employing the N noisy images, N reference images, N noise maps as a mini-batch set forming the training dataset; and
 h. repeating steps a to g for each input image used for training.

13. The method of claim 11, wherein the training dataset includes a training mini batch set created for a given input image, and wherein the mini batch set is formed in a method comprising the steps of:
 a. generating a training noise;
 b. generating N random fractions;
 c. creating N residual noises by multiplying the training noise by each N random fraction;
 d. creating N reference images by adding each of the N residual noises to the input image;
 e. creating N noisy images by adding the training noise to the input image;
 f. creating N noise maps;
 g. employing the N noisy images, N reference images, N noise maps as a mini-batch set forming the training dataset; and
 h. repeating steps a. to g. for each input image used for training.

14. The method of claim 1, further comprising the step of loading the denoiser onto a digital imaging system after the denoiser is trained.

15. The method of claim 1, wherein the method is performed on the digital imaging system.

16. The method of claim 1, wherein the digital imaging system is a medical digital imaging system.

17. A digital imaging system comprising:
 a. a digital imaging source, and a digital imaging detector alignable with the digital imaging source;
 b. an image processing system operably connected to the digital imaging source and digital imaging detector to generate digital image data, the image processing system including a processing unit for processing the digital image data from the detector;
 c. non-transitory memory operably connected to the processing unit and storing instructions for operation of a denoiser and a denoiser training system,
 d. a display operably connected to the image processing system for presenting information to a user, and
 e. a user interface operably connected to the image processing system to enable user input to the image processing system,
  wherein the denoiser is trained according the method of claim 1.

18. A digital imaging system comprising:
a. a digital imaging source, and a digital imaging detector alignable with the digital imaging source;
b. an image processing system operably connected to the digital imaging source and digital imaging detector to generate digital image data, the image processing system including a processing unit for processing the digital image data from the detector;
c. non-transitory memory operably connected to the processing unit and storing instructions for operation of a denoiser,
d. a display operably connected to the image processing system for presenting information to a user, and
e. a user interface operably connected to the image processing system to enable user input to the image processing system;
 wherein the denoiser is trained using a denoiser training system and method configured to generate training noise, to add the training noise to a clean image to form a noisy image, to multiply the training noise by a fraction to create a residual noise, to add the residual noise to the clean image to form a reference image, and to provide the noisy image and the reference image to the denoiser as a training dataset,
 wherein the training dataset including the residual noise in the reference image enables the denoiser to be tuned to remove more or less noise from a noisy image to adjust the strength of the denoising provided by the trained denoiser, and
 wherein the digital imaging system is a digital medical imaging system.

19. The digital imaging system of claim 18, wherein the denoiser and denoiser training system is configured to operate on the digital imaging system or on a computing device remote from the digital imaging system.

20. The digital imaging system of claim 18, wherein the denoiser is loaded onto the digital imaging system after the denoiser is trained.

* * * * *